United States Patent
Bono et al.

(10) Patent No.: US 9,991,535 B2
(45) Date of Patent: Jun. 5, 2018

(54) FUEL CELL SYSTEM AND MAXIMUM POWER CALCULATION METHOD

(71) Applicant: TOYOTA JIDOSHA KABUSHIKI KAISHA, Toyota-shi, Aichi (JP)

(72) Inventors: Tetsuya Bono, Miyoshi (JP); Satoshi Shiokawa, Okazaki (JP); Osamu Hamanoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 136 days.

(21) Appl. No.: 14/927,065

(22) Filed: Oct. 29, 2015

(65) Prior Publication Data

US 2016/0126574 A1 May 5, 2016

(30) Foreign Application Priority Data

Nov. 5, 2014 (JP) ................................. 2014-225229

(51) Int. Cl.
| | |
|---|---|
| H01M 8/04 | (2016.01) |
| H01M 8/04992 | (2016.01) |
| H01M 8/04828 | (2016.01) |
| H01M 8/04223 | (2016.01) |
| H01M 8/04537 | (2016.01) |
| H01M 8/04664 | (2016.01) |
| H01M 8/043 | (2016.01) |
| H01M 8/04746 | (2016.01) |

(52) U.S. Cl.
CPC ....... *H01M 8/04992* (2013.01); *H01M 8/043* (2016.02); *H01M 8/0494* (2013.01); *H01M 8/04238* (2013.01); *H01M 8/04559* (2013.01); *H01M 8/04589* (2013.01); *H01M 8/04619* (2013.01); *H01M 8/04679* (2013.01); *H01M 8/04753* (2013.01); *H01M 2250/20* (2013.01); *Y02T 90/32* (2013.01)

(58) Field of Classification Search
CPC ........... H01M 8/04992; H01M 8/0494; H01M 8/04238; H01M 8/04559; H01M 8/04589; H01M 8/04619; H01M 8/04679; H01M 8/043; H01M 2250/20; H01M 8/04753; Y02T 90/32
See application file for complete search history.

(56) References Cited

U.S. PATENT DOCUMENTS

| | | | |
|---|---|---|---|
| 2002/0192519 A1 | 12/2002 | Fujita et al. | |
| 2007/0088483 A1 | 4/2007 | Yoshida | |
| 2007/0154756 A1* | 7/2007 | Fujita | B60L 11/1887 429/432 |

FOREIGN PATENT DOCUMENTS

| | | | |
|---|---|---|---|
| JP | H11-195423 A | | 7/1999 |
| JP | 2003-068342 A | | 3/2003 |
| JP | 2003-346849 | | 12/2003 |
| JP | 2003346849 A | * | 12/2003 |
| JP | 2005-190938 A | | 7/2005 |
| JP | 2006-202555 A | | 8/2006 |
| JP | 2006202555 A | * | 8/2006 |
| JP | 2006-244966 A | | 9/2006 |
| JP | 2007-048628 A | | 2/2007 |

* cited by examiner

*Primary Examiner* — Muhammad S Siddiquee
(74) *Attorney, Agent, or Firm* — Finnegan, Henderson, Farabow, Garrett & Dunner, LLP

(57) ABSTRACT

The fuel cell system includes: a fuel cell 40 that receives supply of reactant gas to generate power; output characteristic updating means for updating an output characteristic of the fuel cell 40 based on output current and output voltage measured by a current sensor 140 and a voltage sensor 150; maximum power calculation means for calculating, using the output characteristic, the maximum power available at the fuel cell 40; and determination means for determining whether a value of the output characteristic is in an assumed situation where the output characteristic value is assumed to be temporarily lowered, wherein while the output characteristic value is determined by the determination means to be in the assumed situation, the maximum power calculation means calculates the maximum power using the output characteristic updated by the output characteristic updating means just before transition to the assumed situation.

2 Claims, 4 Drawing Sheets

FUEL CELL SYSTEM AND MAXIMUM POWER CALCULATION METHOD

BACKGROUND OF THE INVENTION

Field of the Invention

The present invention relates to a fuel cell system and a maximum power calculation method.

Background Art

Conventionally, a fuel cell system including a fuel cell that receives the supply of reactant gas (fuel gas and oxidizing gas) to generate power has been proposed and put to practical use. Air as oxidizing gas is supplied on a cathode side of the fuel cell in such a fuel cell system, and hydrogen gas as fuel gas is supplied on an anode side of the fuel cell to generate power by the electrochemical reaction of air and hydrogen gas.

In such a fuel cell system, a current-voltage characteristic (hereinafter also called an I-V characteristic) of the fuel cell is estimated to perform control to decide on the output of the fuel cell based on the I-V characteristic in order to improve the power generation efficiency of the fuel cell (see Patent Document 1).

CITATION LIST

Patent Document

[Patent Document 1] JP 2003-346849 A

SUMMARY OF THE INVENTION

In the meantime, since the I-V characteristic varies depending on the operating state or operation environment of the fuel cell, the I-V characteristic value is updated periodically so that an error caused by the variation can be reduced. However, for example, in a fuel cell system having such an I-V characteristic updating function, when the operating state of the fuel cell is shifted to an intermittent operation, the power generation state is lowered. Therefore, in this case, the I-V characteristic value of the fuel cell is updated to a value obtained when the power generation state is lowered. The lowering of the I-V characteristic value means that the value of voltage V to current I is lowered under the same operating conditions.

The intermittent operation is an operating state temporarily shifted, such as during idling, traveling at low speed, or regenerative braking, which is often returned to the normal operation in a short time. When the I-V characteristic value is updated during such an intermittent operation and then the normal operation is resumed, the fuel cell is controlled based on the I-V characteristic when the power generation state is lowered until the I-V characteristic value is updated next. In this case, power lower than the maximum power actually available at the fuel cell is calculated and controlled as the maximum power of the fuel cell.

The present invention has been made in view of such circumstances, and it is an object thereof to provide a fuel cell system and a maximum power calculation method capable of reducing an error in calculating the maximum power available at a fuel cell.

In order to attain the object, a fuel cell system according to the present invention includes: a fuel cell that receives supply of reactant gas to generate power; measurement means for measuring output current and output voltage of the fuel cell; output characteristic updating means for updating an output characteristic of the fuel cell based on the output current and the output voltage measured by the measurement means; maximum power calculation means for calculating, using the output characteristic, the maximum power available at the fuel cell; and determination means for determining whether a value of the output characteristic is in an assumed situation where the output characteristic value is assumed to be temporarily lowered, wherein while the output characteristic value is determined by the determination means to be in the assumed situation, the maximum power calculation means calculates the maximum power using the output characteristic updated by the output characteristic updating means just before transition to the assumed situation.

A current-voltage characteristic estimation method according to the present invention is a method of calculating the maximum power available at a fuel cell that receives supply of reactant gas to generate power, the method including: a measurement step of measuring output current and output voltage of the fuel cell; an output characteristic updating step of updating an output characteristic of the fuel cell based on the output current and the output voltage measured in the measurement step; a maximum power calculation step of calculating the maximum power using the output characteristic; and a determination step of determining whether a value of the output characteristic is in an assumed situation where the output characteristic value is assumed to be temporarily lowered, wherein while the output characteristic value is determined in the determination step to be in the assumed situation, the output characteristic updated in the output characteristic updating step just before transition to the assumed situation is used to calculate the maximum power in the maximum power calculation step.

By employing the above configuration and method, the output characteristic of the fuel cell can be updated as needed based on the output current and the output voltage measured by the measurement means to calculate the maximum power available at the fuel cell using the updated output characteristic, and while the output characteristic value is determined to be in the assumed situation where it is assumed to be temporarily lowered, the output characteristic updated just before transition to the assumed situation can be used to calculate the maximum power.

In the fuel cell system, when the maximum power calculated by the maximum power calculation means is limited, notification means can further be included to notify a user that the maximum power is limited.

In the fuel cell system, the assumed situation may be at least during an intermittent operation in which power generation of the fuel cell is temporarily halted to supply the reactant gas intermittently, during operation in such a state that the supply of the reactant gas is deficient, or while the output voltage is lowered to a value not higher than an assumed value.

According to the present invention, a fuel cell system capable of reducing an error in calculating the maximum power available at a fuel cell can be provided.

DESCRIPTION OF THE PREFERRED EMBODIMENT

A fuel cell system according to an embodiment of the present invention will be described below with reference to the accompanying drawings. The fuel cell system according to the embodiment is a power generation system mounted on a fuel cell vehicle (FCHV: Fuel Cell Hybrid Vehicle) as a moving vehicle.

Figure 1:
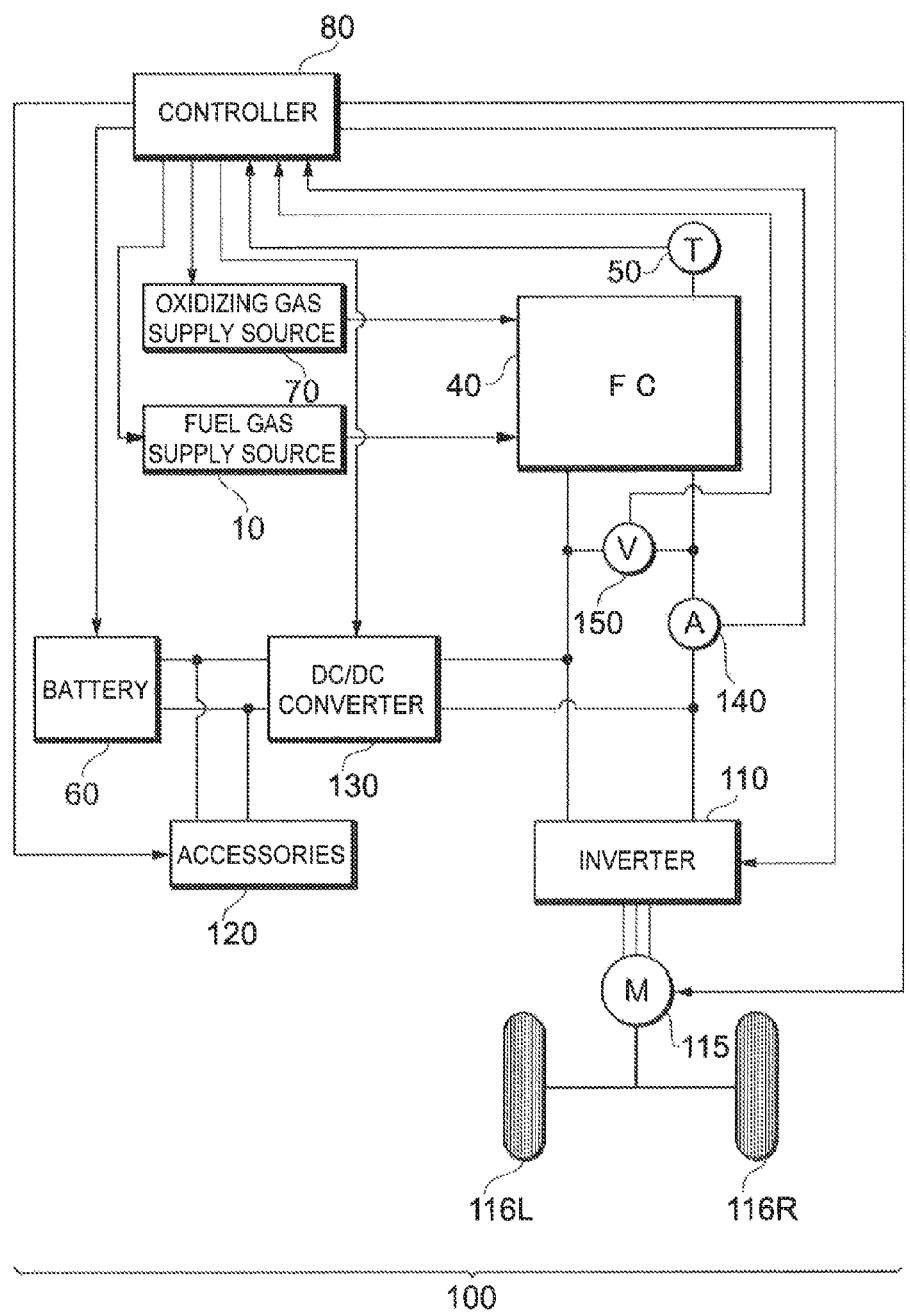
FIG. 1 is a configuration diagram of a fuel cell system according to an embodiment of the present invention.

Referring first to FIG. 1, the configuration of the fuel cell system according to the embodiment will be described. FIG. 1 is a schematic configuration of a vehicle on which a fuel cell system 100 according to the embodiment is mounted.

A fuel cell 40 is means for generating power from supplied reactant gas (fuel gas and oxidizing gas), and various types of fuel cells, such as a solid polymer type, a phosphoric acid type, and a molten carbonate type, can be used. The fuel cell 40 has a stack structure in which multiple single cells including MEA and the like are stacked in series. Output current and output voltage of this fuel cell 40 at an actual operation working point are detected by a current sensor 140 and a voltage sensor 150, respectively. Fuel gas such as hydrogen gas is supplied from a fuel gas supply source 10 to a fuel electrode (anode) of the fuel cell 40, and oxidizing gas such as air is supplied from an oxidizing gas supply source 70 to an oxygen electrode (cathode).

The fuel gas supply source 10 is, for example, composed of a hydrogen tank, various valves, and the like, and the valve opening, ON/OFF time, and the like are adjusted to control the amount of fuel gas to be supplied to the fuel cell 40. The oxidizing gas supply source 70 is, for example, composed of an air compressor, a motor for driving the air compressor, an inverter, and the like, and the number of revolutions of this motor and the like are adjusted to adjust the amount of oxidizing gas to be supplied to the fuel cell 40.

A battery 60 is a secondary battery that can charge and discharge, which is, for example, composed of a nickel-metal hydride battery and the like. Instead of the battery 60, a capacitor capable of charging and discharging other than the secondary battery may be provided. This battery 60 and the fuel cell 40 are connected in parallel with an inverter 110 for a traction motor, and a DC/DC converter 130 is provided between the battery 60 and the inverter 110.

The inverter 110 is, for example, a pulse-width modulation (PWM) inverter to convert, to three-phase AC power, DC power output from the fuel cell 40 or the battery 60 in response to a control command given from a controller 80, and supply it to a traction motor 115. The traction motor 115 is a motor for driving wheels 116L, 116R, and the number of revolutions of this motor is controlled by the inverter 110.

The DC/DC converter 130 has the function of stepping up or down DC voltage input from the battery 60 to output it on the side of the fuel cell 40, and the function of stepping up or down DC voltage input from the fuel cell 40 or the like to output it on the side of the battery 60. The functions of the DC/DC converter 130 realize the charging and discharging of the battery 60. As the DC/DC converter 130, for example, a full-bridge converter composed of four power transistors and a dedicated drive circuit can be employed.

Accessories 120 such as vehicle accessories and FC accessories are connected between the battery 60 and the DC/DC converter 130. The battery 60 serves as a power source of these accessories 120. Note that the vehicle accessories mean various power appliances (lighting equipment, air conditioner, hydraulic pump, etc.) used during driving of the vehicle, and the FC accessories means various power appliances (pumps for supplying fuel gas and oxidizing gas, etc.) used for the operation of the fuel cell 40.

The controller 80 is composed of a CPU as an arithmetic processing unit, and a ROM and a RAM as memories, and the like to control each unit of the fuel cell system 100 integrally based on each sensor signal input from the voltage sensor 150 (measurement means) for detecting FC voltage, the current sensor 140 (measurement means) for detecting FC current, a temperature sensor 50 for detecting the temperature of the fuel cell 40, an SOC sensor (not shown) for detecting the charging state of the battery 60, an accelerator pedal sensor (not shown) for detecting the position of the accelerator pedal, or the like.

The controller 80 has a function (output characteristic updating means) to start the operation of the fuel cell 40 when receiving a start signal output from an ignition switch, acquire the output voltage and output current of the fuel cell 40 from the voltage sensor 150 and the current sensor 140 every predetermined computing cycle, and sequentially update an I-V characteristic map of the fuel cell 40. Illustratively, the controller 80 assumes that the voltage of the fuel cell 40 can be expressed as a function of current (linear function or function of a predetermined dimension) to create the I-V characteristic map using a least-square estimation method or the like. The controller 80 sequentially updates a current-power characteristic (hereinafter also called an I-P characteristic) map based on this I-V characteristic map. Here, it is known that the I-P characteristic map is defined unambiguously based on the I-V characteristic map. In this specification, either the I-V characteristic map or the I-P characteristic map is called, or both of them are collectively called the output characteristic map of the fuel cell 40. The I-V characteristic map and the I-P characteristic map are stored in a memory.

The controller 80 decides on the distribution of output power to the fuel cell 40 and the battery 60, respectively, based on the output characteristic map, controls an oxidizing gas supply system and a fuel gas supply system so that the power generation amount of the fuel cell 40 will coincide with target power, and controls the DC/DC converter 130 to regulate the output voltage of the fuel cell 40 in order to control the operation point (output voltage, output current) of the fuel cell 40.

The controller 80 has a function (determination means) to determine whether the value of the output characteristic map is in a situation assumed to be temporarily lowered (hereinafter called an "assumed situation"). As the assumed situation, for example, there are cases during the intermittent operation, during operation in an air deficiency state, in an abnormally lowered state of voltage, and the like.

The intermittent operation is operation for temporarily halting the power generation of the fuel cell 40 to supply reactant gas intermittently. The operation in the air deficiency state is operation in a state where the supply of oxidizing gas is deficient, which corresponds to rapid warm-up operation, for example. The abnormally lowered state of voltage means a state where the cell voltage or stack voltage of the fuel cell 40 is lower than or equal to assumed voltage. The voltage lower than or equal to the assumed voltage is set for a range where the cells of the fuel cell 40 are assumed to be deteriorated.

The controller 80 has a function (maximum power calculation means) to calculate, using the output characteristic map, the maximum power available at the fuel cell 40. During the assumed situation, the controller 80 in this function calculates the maximum power using the output characteristic map updated just before the transition to the assumed situation. In other words, the controller 80 stops updating the output characteristic map during the assumed situation.

Note that the number of output characteristic maps is not limited to one. For example, an output characteristic map continuously updated on an as-needed basis and an output characteristic map the update of which is stopped in the assumed situation may be so prepared that the output characteristic map used in calculating the maximum power will be switched depending on whether in the assumed situation or not.

When the calculated maximum power is more limited than the maximum power available in the nature of the case, the controller 80 has a function (notification means) to notify a driver that the maximum power is limited. For example, a case where an output limiting process is performed to limit the output current of the fuel cell 40 due to the deterioration of the power generation state corresponds to the case where the maximum power is limited. The conditions under which the output limiting process is performed include, for example, a case where the temperature of the fuel cell 40 is higher than a stability range, a case where the remaining level of fuel gas is lowered up to an attention-requiring range, and a case where the moisture state of the stack of the fuel cell 40 is excessively dry.

The notification to the driver may be provided by displaying, on a display device, that the maximum power is limited, or by outputting, from a speaker, a voice message or sound to make it known that the maximum power is limited.

Figure 2:
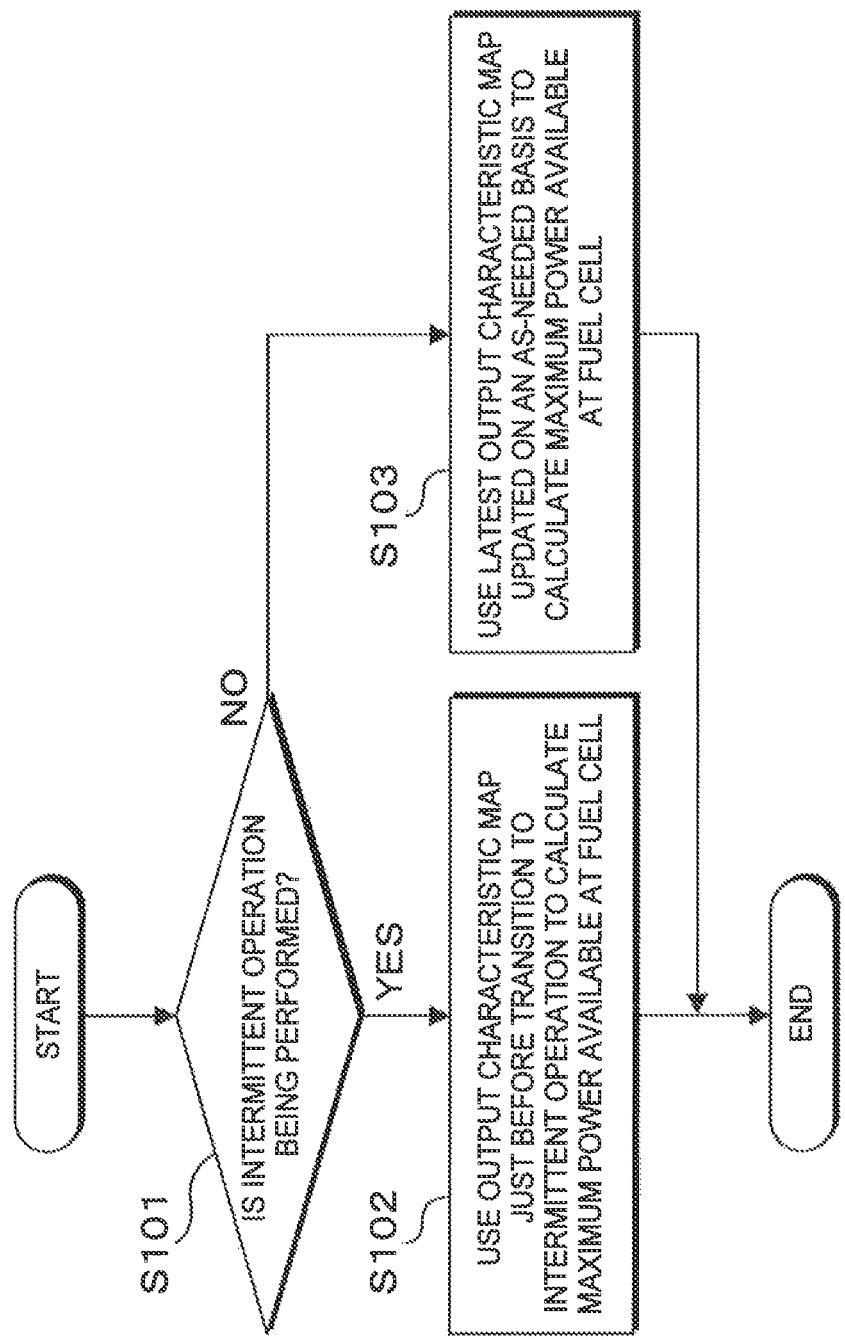
FIG. 2 is a flowchart for describing a maximum power calculation method of the fuel cell system in FIG. 1.
Figure 3:
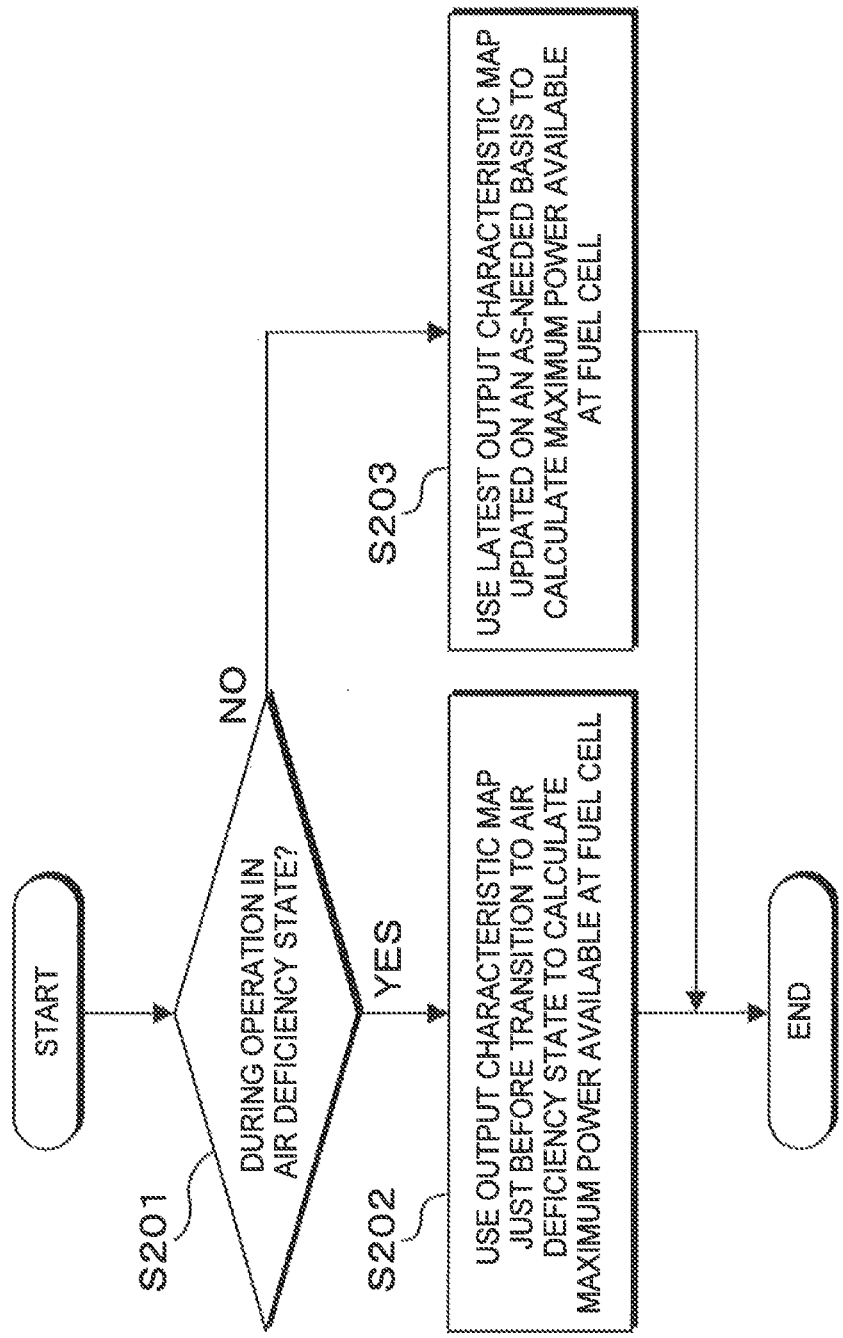
FIG. 3 is a flowchart for describing the maximum power calculation method of the fuel cell system in FIG. 1.
Figure 4:
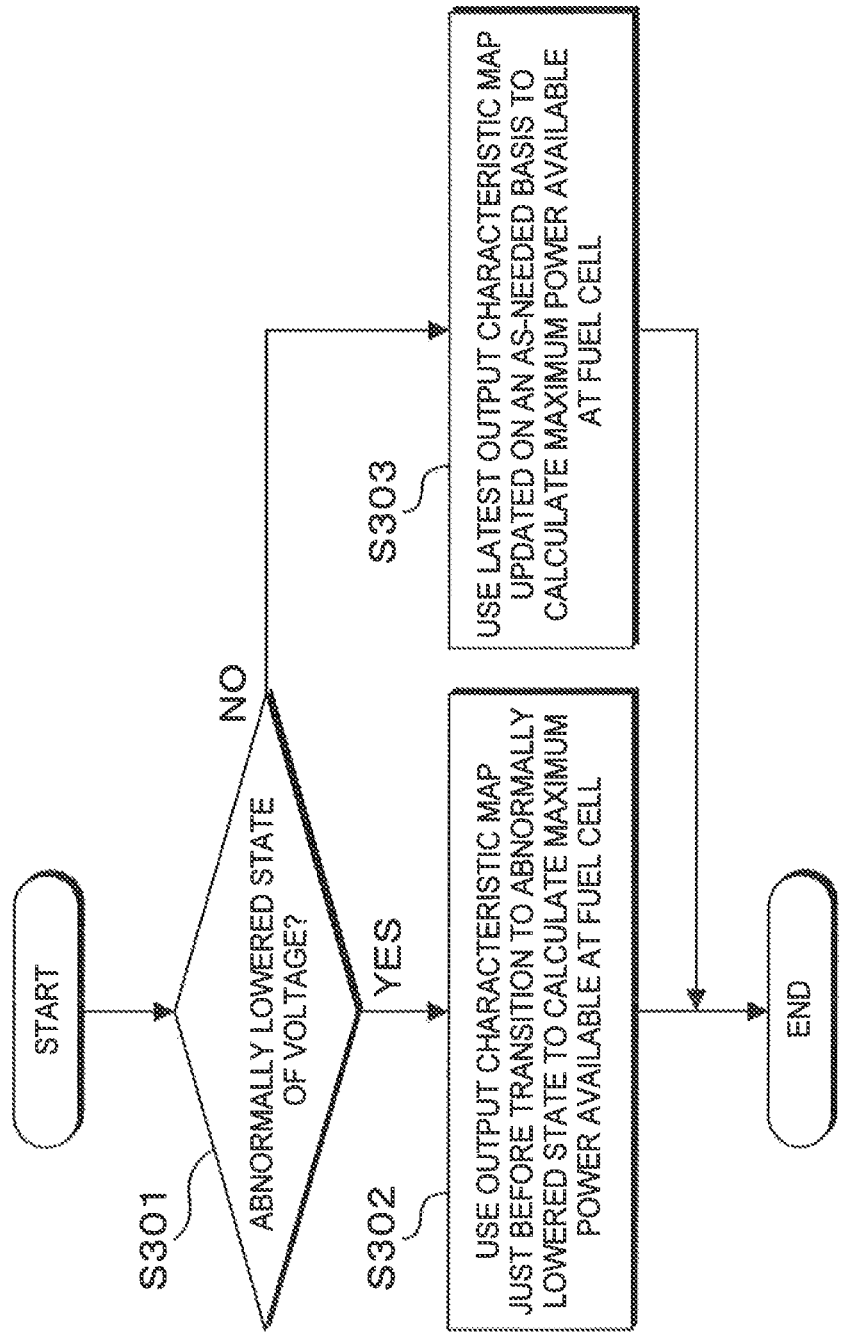
FIG. 4 is a flowchart for describing the maximum power calculation method of the fuel cell system in FIG. 1.

Referring next to FIG. 2 to FIG. 4, the maximum power calculation function by the controller 80 will be specifically described. FIG. 2 is a flowchart illustrating a processing procedure when the assumed situation is the intermittent operation. This processing procedure is repeatedly executed from the start of the operation of the fuel cell 40 until the stop of the operation.

First, the controller 80 determines whether the intermittent operation is being performed (step S101). When this determination is YES, the controller 80 uses the output characteristic map updated just before the intermittent operation is performed to calculate the maximum power available at the fuel cell 40 (step S102).

On the other hand, when it is determined in the above step S101 that the intermittent operation is not being performed (NO in step S101), the controller 80 uses the latest output characteristic map updated on an as-needed basis every predetermined computing cycle to calculate the maximum power available at the fuel cell 40 (step S103).

Here, a known technique can be used appropriately as the method of calculating available maximum power to be illustratively described below.

First, according to the output requirements output based on driver's driving operations such as accelerator pedal operations, the controller 80 decides on output target power of the fuel cell 40. Then, based on the I-P characteristic map, the controller 80 acquires output target current corresponding to the output target power. Then, based on the I-V characteristic map, the controller 80 acquires output target voltage corresponding to the output target current. This enables the controller 80 to calculate the maximum power based on the output target current and the output target voltage.

Further, for example, when the output limiting process is being performed, available maximum power is calculated as follows: Based on the I-V characteristic map, the controller 80 acquires output target voltage corresponding to output-limited target current. This enables the controller 80 to calculate the maximum power based on the output-limited target current and the output target voltage.

FIG. 3 is a flowchart illustrating a processing procedure when the assumed situation is during operation in an air deficiency state. This processing procedure is repeatedly executed from the start of the operation of the fuel cell 40 until the stop of the operation.

First, the controller 80 determines whether it is during operation in the air deficiency state (step S201). When this determination is YES, the controller 80 uses the output characteristic map updated just before the transition to the operation in the air deficiency state to calculate the maximum power available at the fuel cell 40 (step S202).

On the other hand, when it is determined in the above step S201 that it is not during the operation in the air deficiency state (NO in step S201), the controller 80 uses the latest output characteristic map updated on an as-needed basis every predetermined computing cycle to calculate the maximum power available at the fuel cell 40 (step S203).

FIG. 4 is a flowchart illustrating a processing procedure when the assumed situation corresponds to an abnormally lowered state of voltage. This processing procedure is repeatedly executed from the start of the operation of the fuel cell 40 until the stop of the operation.

First, the controller 80 determines whether it corresponds to the abnormally lowered state of voltage (step S301). When this determination is YES, the controller 80 uses the output characteristic map updated just before it corresponds to the abnormally lowered state of voltage to calculate the maximum power available at the fuel cell 40 (step S302).

On the other hand, when it is determined in the above step S301 that it does not correspond to the abnormally lowered state of voltage (NO in step S301), the controller 80 uses the latest output characteristic map updated on an as-needed basis every predetermined computing cycle to calculate the maximum power available at the fuel cell 40 (step S303).

According to the fuel cell system 100 of the embodiment described above, the output characteristic of the fuel cell 40 is updated as needed based on the output current and the output voltage measured by the current sensor 140 and the voltage sensor 150 so that the maximum power available at the fuel cell 40 can be calculated using the updated output characteristic. On the other hand, while it is determined that the output characteristic value is in the assumed situation where the output characteristic value is assumed to be temporarily lowered, the output characteristic updated just before the transition to the assumed situation can be used to calculate the maximum power.

Therefore, according to the fuel cell system 100 of the embodiment, an error in calculating the maximum power available at the fuel cell 40 can be reduced.

Although the example of mounting, in a fuel cell vehicle, the fuel cell system according to the present invention is shown in the above embodiment, the fuel cell system according to the present invention can also be mounted in various moving vehicles (robots, boats and ships, aircraft, etc.) other than the fuel cell vehicle. Further, the fuel cell system according to the present invention may be applied to a stationary power generation system used as a power generating facility for constructions (houses, buildings, etc.). Furthermore, it can be applied to a portable fuel cell system.

REFERENCE NUMERALS

10 . . . fuel gas supply source, 40 . . . fuel cell, 50 . . . temperature sensor, 60 . . . battery, 70 . . . oxidizing gas supply source, 80 . . . controller, 100 . . . fuel cell system, 110 . . . inverter, 115 . . . traction motor, 120 . . . accessories, 130 . . . DC/DC converter, 140 . . . current sensor, 150 . . . voltage sensor.

What is claimed is:

1. A maximum power calculation method for calculating maximum power available at a fuel cell that receives supply of reactant gas to generate power, comprising:
 - a measurement step of measuring output current and output voltage of the fuel cell;
 - an output characteristic updating step of updating, in predetermined computing cycles, an output characteristic map of the fuel cell based on the output current and the output voltage measured in the measurement step;
 - a step of controlling an operation point of the fuel cell based on the output characteristic map updated in the predetermined computing cycles, the operation point being defined by the output current and the output voltage;
 - a maximum power calculation step of calculating the maximum power by acquiring, from the output characteristic map, output target current and output target voltage, each corresponding to output target power of the fuel cell, and referring to the acquired output target current and output target voltage; and
 - a determination step of determining whether an output characteristic value of the fuel cell corresponds to an assumed situation where the output characteristic value is assumed to be temporarily lowered, the assumed situation being any of: during an intermittent operation in which power generation of the fuel cell is halted to supply the reactant gas intermittently; during an operation in an air deficiency state in which supply of oxidizing gas, being the reactant gas, is deficient; and in an abnormally lowered state of voltage in which the output voltage is lowered to a value not higher than an assumed value,
 - wherein while the output characteristic value is determined as corresponding to the assumed situation in the determination step, the output characteristic map updated in the output characteristic updating step just before transition to the assumed situation is used to calculate the maximum power in the maximum power calculation step.

2. The maximum power calculation method according to claim 1, further comprising a notification step in which, when the maximum power calculated in the maximum power calculation step is limited, a user is notified that the maximum power is limited.

\* \* \* \* \*